United States Patent

Okada

(10) Patent No.: US 11,781,994 B2
(45) Date of Patent: Oct. 10, 2023

(54) MEASUREMENT APPARATUS AND MEASUREMENT METHOD

(71) Applicant: YOKOGAWA ELECTRIC CORPORATION, Musashino (JP)

(72) Inventor: Syuhei Okada, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 60 days.

(21) Appl. No.: 17/707,287

(22) Filed: Mar. 29, 2022

(65) Prior Publication Data

US 2022/0317056 A1 Oct. 6, 2022

(30) Foreign Application Priority Data

Mar. 30, 2021 (JP) ................................. 2021-058308

(51) Int. Cl.
  *G01J 3/28* (2006.01)
  *G01N 21/88* (2006.01)
  *G01N 21/17* (2006.01)

(52) U.S. Cl.
  CPC ............ *G01N 21/8851* (2013.01); *G01J 3/28* (2013.01); *G01N 21/17* (2013.01); *G01J 2003/2859* (2013.01); *G01N 2021/1738* (2013.01)

(58) Field of Classification Search
  CPC .... G01N 21/8851; G01N 21/17; G01N 23/18; G01N 2021/1738; G01N 21/81;
  (Continued)

(56) References Cited

U.S. PATENT DOCUMENTS

| 2008/0185525 A1* | 8/2008 | Lyubchik ............... G01V 9/005 250/342 |
| 2018/0034054 A1* | 2/2018 | Chan ......................... B01J 2/18 |
| 2021/0041292 A1 | 2/2021 | Chen et al. |

FOREIGN PATENT DOCUMENTS

| JP | 2011-247712 A | 12/2011 |
| JP | 5684819 B2 | 3/2015 |

(Continued)

OTHER PUBLICATIONS

Abina et al., "Qualitative and quantitative analysis of calcium-based microfillers using terahertz spectroscopy and imaging", TALANTA, 2015, vol. 143, pp. 169-177, cited in EP Extended European Search Report dated Jul. 27, 2022. (9 pages).

(Continued)

*Primary Examiner* — Abdullahi Nur
(74) *Attorney, Agent, or Firm* — WHDA, LLP

(57) ABSTRACT

A measurement apparatus (10) includes a generator (121) that irradiates electromagnetic waves on a measurement target (M) including a substance that undergoes a structural transition from a first substance with an unstable structure to a second substance with a stable structure due to entry of a foreign substance, a receiver (122) that receives the electromagnetic waves including information on a spectroscopic spectrum of the measurement target (M), and a controller (116) that acquires the measured spectroscopic spectrum based on the electromagnetic waves received by the receiver (122), calculates ratio information between the first substance and the second substance based on the acquired measured spectroscopic spectrum, and generates diagnostic information regarding entry of the foreign substance based on the ratio information.

10 Claims, 9 Drawing Sheets

(58) Field of Classification Search
CPC ........... G01N 21/3554; G01N 21/3563; G01N 21/3581; G01J 3/28; G01J 2003/2859
See application file for complete search history.

(56) References Cited

FOREIGN PATENT DOCUMENTS

| | | |
|---|---|---|
| JP | 2016-114572 A | 6/2016 |
| WO | 2011/047016 A1 | 4/2011 |

OTHER PUBLICATIONS

Mizuno et al., "Analysis of calcium carbonate for differentiating between pigments using terahertz spectroscopy", Journal of the European Optical Society: Rapid Publications, 2009, vol. 4, cited in EP Extended European Search Report dated Jul. 27, 2022. (4 pages).

* cited by examiner

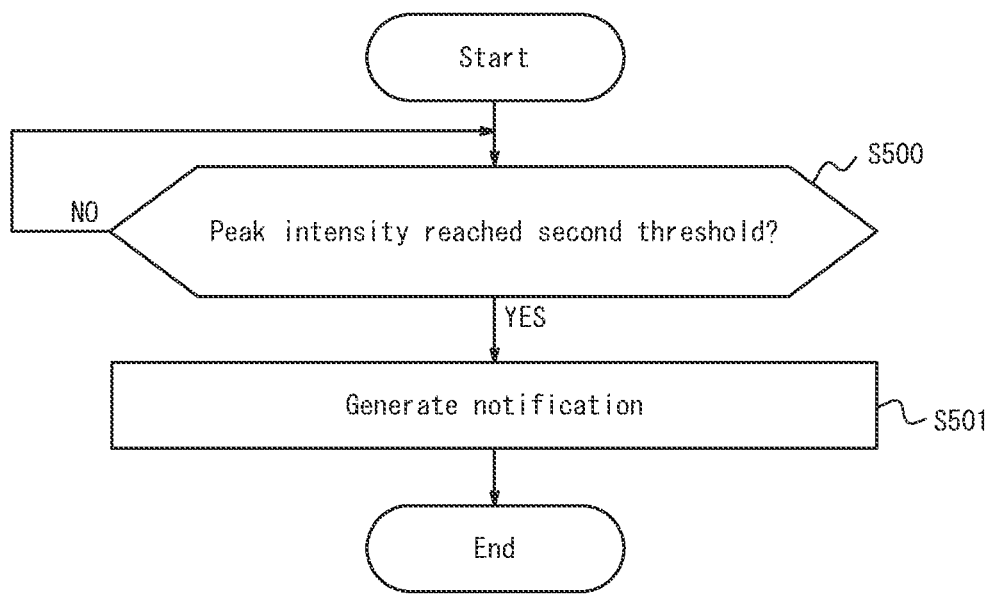
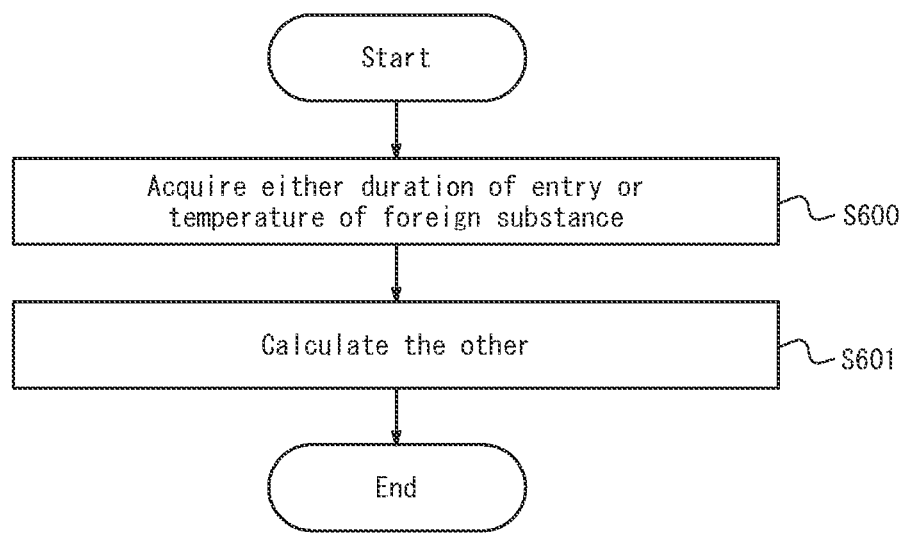

MEASUREMENT APPARATUS AND MEASUREMENT METHOD

CROSS-REFERENCE TO RELATED APPLICATION

The present application claims priority to Japanese Patent Application No. 2021-058308 filed on Mar. 30, 2021, the entire contents of which are incorporated herein by reference.

TECHNICAL FIELD

The present disclosure relates to a measurement apparatus and a measurement method.

BACKGROUND

Technology for non-destructive measurement of the state of a measurement target near the interface and inside of the measurement target is known.

For example, patent literature (PTL) 1 discloses a system for determining the characteristics of a boundary surface between a first layer and a second layer. Such a system includes a transmitter that outputs electromagnetic radiation to a sample, a receiver that receives electromagnetic radiation reflected by or transmitted through the sample, and a data collection device. The system determines material characteristics, including the adhesion strength between the first layer and the second layer, based on waveform data representing the electromagnetic radiation reflected by or transmitted through the sample.

CITATION LIST

Patent Literature

PTL 1: JP 5684819 B2

SUMMARY

A measurement apparatus according to an embodiment includes a generator configured to irradiate electromagnetic waves on a measurement target including a substance that undergoes a structural transition from a first substance with an unstable structure to a second substance with a stable structure due to entry of a foreign substance; a receiver configured to receive the electromagnetic waves including information on a spectroscopic spectrum of the measurement target; and a controller configured to acquire the measured spectroscopic spectrum based on the electromagnetic waves received by the receiver, calculate ratio information between the first substance and the second substance based on the acquired measured spectroscopic spectrum, and generate diagnostic information regarding entry of the foreign substance based on the ratio information.

BRIEF DESCRIPTION OF THE DRAWINGS

In the accompanying drawings:

FIG. 7 is a flowchart illustrating a fifth example of operations of the measurement apparatus in FIG. 1;

FIG. 8 is a flowchart illustrating a sixth example of operations of the measurement apparatus in FIG. 1;

DETAILED DESCRIPTION

Figure 1:
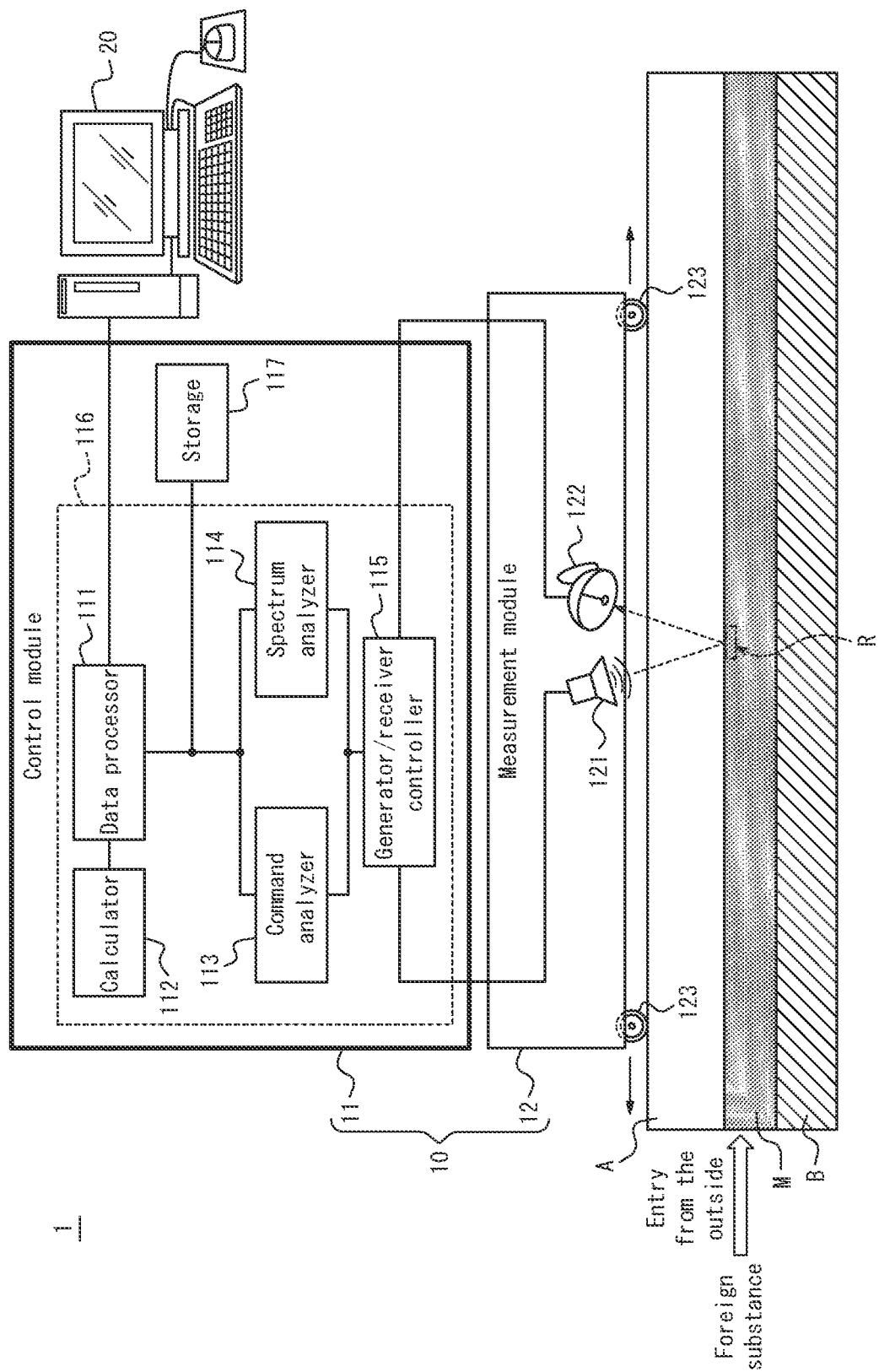
FIG. 1 is a schematic diagram illustrating the configuration of a measurement system including a measurement apparatus according to a first embodiment of the present disclosure.

Such conventional technology is effective after a physical defect or damage has occurred but has trouble detecting slight chemical changes in the measurement target. For example, when a foreign substance such as moisture enters into a measurement target such as an adhesive, the hydrogen bonds at the interface of the adhesive are irreversibly broken, and recombination does not occur, even after the adhesive is dried. In order to detect such a slight chemical change in the measurement target indirectly, accurate detection of the entry of a foreign substance into the measurement target is necessary.

It would be helpful to provide a measurement apparatus and a measurement method capable of accurately detecting the entry of a foreign substance into a measurement target.

A measurement apparatus according to an embodiment includes a generator configured to irradiate electromagnetic waves on a measurement target including a substance that undergoes a structural transition from a first substance with an unstable structure to a second substance with a stable structure due to entry of a foreign substance; a receiver configured to receive the electromagnetic waves including information on a spectroscopic spectrum of the measurement target; and a controller configured to acquire the measured spectroscopic spectrum based on the electromagnetic waves received by the receiver, calculate ratio information between the first substance and the second substance based on the acquired measured spectroscopic spectrum, and generate diagnostic information regarding entry of the foreign substance based on the ratio information.

This configuration enables accurate detection of entry of a foreign substance into the measurement target. For example, the measurement apparatus calculates the ratio information between the first substance and the second substance based on the acquired measured spectroscopic spectrum and generates the diagnostic information regarding entry of the foreign substance based on the ratio information. For example, the measurement apparatus takes an adhesive or the like, to which vaterite has been added in advance as a marker, as the measurement target and uses terahertz spectroscopy to observe the irreversible crystal structure transition from vaterite to calcite caused by moisture.

This configuration enables the measurement apparatus to detect the history of moisture entry into the adhesive. In other words, the user can confirm whether a foreign substance has entered into the measurement target in the past based on non-destructive and non-contact measurement. This enables detection of deterioration of the adhesive due to moisture, even if water enters into the adhesive from outside and subsequently dries out. The measurement apparatus can estimate or indirectly detect slight chemical changes in the measurement target. For example, when a foreign substance such as moisture enters into a measurement target such as an adhesive, the hydrogen bonds at the interface of the adhesive are irreversibly broken, and recombination does not occur, even after the adhesive is dried. The measurement apparatus can estimate or indirectly detect such slight chemical changes in the measurement target.

In the measurement apparatus of an embodiment, the controller may execute a fitting calculation process on the acquired measured spectroscopic spectrum based on reference data and a fitting parameter necessary for calculating the spectroscopic spectrum and an initial value of the fitting parameter to calculate a ratio of the second substance to the first substance as the ratio information.

For example, in a case in which the first and second adherends are bonded by an adhesive, which is the measurement target, sandwiched between the first and second adherends, the aforementioned ratio together with the thickness of the first adherend can thereby be calculated accurately by also using the thickness of the first adherend as a fitting parameter, even if the thickness of a portion of the first adherend adjacent to the measurement region is unknown. For example, the first adherend might scrape off as a result of long-term use while the first and second adherends are bonded by the measurement target. Even in such a case in which the thickness of the first adherend has changed since the start of use of the first adherend, the measurement apparatus can accurately calculate the aforementioned ratio along with the thickness of the first adherend.

In the measurement apparatus of an embodiment, upon determining that a parameter included in the ratio information has increased, the controller may generate a history indicating entry of the foreign substance into the measurement target as the diagnostic information. This enables the user to check such a history via a terminal apparatus, for example. By confirming such a history via a terminal apparatus or the like, the user can easily understand that a foreign substance entered into the measurement target.

In the measurement apparatus of an embodiment, upon determining that a parameter included in the ratio information has reached a threshold, the controller may generate a notification indicating deterioration of the measurement target due to entry of the foreign substance as the diagnostic information. This enables the user to check such a notification via a terminal apparatus, for example. By confirming such a notification as a warning via a terminal apparatus or the like, the user can easily understand that deterioration of the measurement target due to entry of the foreign substance has exceeded an allowable range.

In the measurement apparatus of an embodiment, based on the ratio information, the controller may calculate a duration of entry of the foreign substance into the measurement target or a temperature of the foreign substance during entry of the foreign substance into the measurement target as the diagnostic information. This enables the user to check such information via a terminal apparatus, for example. By confirming such information via a terminal apparatus or the like, the user can easily recognize a parameter related to entry of the foreign substance into the measurement target.

The measurement apparatus of an embodiment may further include a movable part configured to move the measurement apparatus to enable scanning of an irradiation position of the electromagnetic waves on the measurement target, and in conjunction with movement of the measurement apparatus based on the movable part, the controller may generate a spatial distribution of the ratio information in the measurement target as the diagnostic information. By using a terminal apparatus or the like to confirm such a spatial distribution as the measurement result, the user can easily recognize the deterioration of the measurement target due to entry of a foreign substance over a wide range of parts in the measurement target.

In the measurement apparatus of an embodiment, the ratio information may include a ratio of the second substance to the first substance in the measurement target and/or a peak intensity of the spectroscopic spectrum. By calculating the ratio of the second substance to the first substance as the ratio information, the measurement apparatus can accurately generate diagnostic information. By calculating the peak intensity of the spectroscopic spectrum as the ratio information, the measurement apparatus can reduce the calculation load compared to when the measurement apparatus calculates the ratio of the second substance to the first substance by, for example, a fitting calculation process.

In the measurement apparatus of an embodiment, the foreign substance may include calcium carbonate, the first substance may include calcium carbonate with a vaterite crystal structure, and the second substance may include calcium carbonate with a calcite crystal structure. This enables the measurement apparatus to use calcium carbonate, which can take on two types of crystal structures that exhibit a marked difference regarding the presence or absence of an absorption peak near 3.27 THz, to generate the diagnostic information accurately.

In the measurement apparatus of an embodiment, the spectroscopic spectrum may include a reflection spectrum and/or a transmission spectrum of the measurement target.

For example, by the spectroscopic spectrum including the reflection spectrum of the measurement target, the measurement apparatus can easily detect the history of entry of the foreign substance into the measurement target near the interface on the first adherend side in a case in which the first adherend and the second adherend are bonded by the adhesive, which is the measurement target, sandwiched between the first and second adherends. For example, the measurement apparatus can easily estimate or indirectly detect slight chemical changes, such as irreversible breaking of hydrogen bonds at the interface of the adhesive.

For example, by the spectroscopic spectrum including the transmission spectrum of the measurement target, the measurement apparatus can easily detect the history of entry of the foreign substance as average information over the entire measurement region along the thickness of the measurement target.

For example, by the measurement apparatus acquiring both the reflection spectrum and the transmission spectrum of the measurement target, the user can recognize whether the foreign substance has entered into the measurement target from the interface on the first adherend side or the interface on the second adherend side in a case in which the first adherend and the second adherend are bonded by the adhesive, which is the measurement target, sandwiched between the first and second adherends. For example, in a case in which a history of entry of the foreign substance is not detected based on the reflection spectrum of the measurement target whereas a history of entry of the foreign substance is detected based on the transmission spectrum of the measurement target, the user can determine that the foreign substance entered into the measurement target from the interface on the second adherend side.

A measurement method according to an embodiment includes irradiating electromagnetic waves on a measurement target including a substance that undergoes a structural transition from a first substance with an unstable structure to a second substance with a stable structure due to entry of a foreign substance; receiving the electromagnetic waves including information on a spectroscopic spectrum of the measurement target; acquiring the measured spectroscopic spectrum based on the received electromagnetic waves; calculating ratio information between the first substance and the second substance based on the acquired measured spectroscopic spectrum; and generating diagnostic information regarding entry of the foreign substance based on the calculated ratio information.

This configuration enables accurate detection of entry of a foreign substance into the measurement target. For example, the ratio information between the first substance and the second substance is calculated based on the acquired measured spectroscopic spectrum, and the diagnostic information regarding entry of the foreign substance is generated based on the ratio information. For example, an adhesive or the like, to which vaterite has been added in advance as a marker, is taken as the measurement target, and terahertz spectroscopy is used to observe the irreversible crystal structure transition from vaterite to calcite caused by moisture.

This configuration achieves detection of the history of moisture entry into the adhesive. In other words, the user can confirm whether a foreign substance has entered into the measurement target in the past based on non-destructive and non-contact measurement. This enables detection of deterioration of the adhesive due to moisture, even if water enters into the adhesive from outside and subsequently dries out. Slight chemical changes in the measurement target can be estimated or indirectly detected. For example, when a foreign substance such as moisture enters into a measurement target such as an adhesive, the hydrogen bonds at the interface of the adhesive are irreversibly broken, and recombination does not occur, even after the adhesive is dried. With this measurement method, such slight chemical changes in the measurement target can be estimated or indirectly detected.

According to the present disclosure, a measurement apparatus and a measurement method capable of accurately detecting the entry of a foreign substance into a measurement target can be provided.

Embodiments of the present disclosure are mainly described below with reference to the drawings.

First Embodiment

FIG. 1 is a schematic diagram illustrating the configuration of a measurement system 1 including a measurement apparatus 10 according to a first embodiment of the present disclosure. For a measurement target M including a substance that undergoes a structural transition from a first substance with an unstable structure to a second substance with a stable structure due to entry of a foreign substance, the measurement apparatus 10 calculates ratio information between the first substance and the second substance.

In the present specification, the "substance" includes, for example, calcium carbonate. The "first substance" includes, for example, calcium carbonate with an unstable crystal structure of vaterite. The "second substance" includes, for example, calcium carbonate with a stable crystal structure of calcite. The "measurement target M" includes, for example, an adhesive that bonds a first adherend A to a second adherend B. The "ratio information between the first substance and the second substance" includes, for example, the ratio of the second substance to the first substance in the measurement target M and/or the peak intensity of the spectroscopic spectrum described below. As described below with reference to FIG. 2 and the like, the peak intensity of the spectroscopic spectrum largely depends on the ratio of the second substance to the first substance. Therefore, the peak intensity can also be included in the ratio information between the first substance and the second substance instead of or in addition to the ratio of the second substance to the first substance. The "foreign substance" includes, for example, water and steam.

For example, the material of the measurement target M is intentionally doped with an additive that contains a predetermined proportion of the first substance. Such an additive includes, for example, any additive that does not affect the adhesive function of the measurement target M as an adhesive. Such an additive is used to include a predetermined proportion of the first substance, which is necessary for the measurement, in the measurement target M and is formed by a substance different from foreign substances that are unintentionally mixed in. For example, the additive includes the above-described calcium carbonate.

The measurement apparatus 10 is used in the case in which the measurement target M is an adhesive or the like to which the first substance, such as vaterite, has been added in advance as a marker, and a foreign substance such as water enters into the measurement target M from the outside. For example, the measurement apparatus 10 uses terahertz spectroscopy in such a case to observe the irreversible crystal structure transition from vaterite to calcite caused by moisture.

In addition to the measurement apparatus 10, the measurement system 1 includes a terminal apparatus 20 communicably connected to the measurement apparatus 10. The measurement apparatus 10 includes a control module 11 and a measurement module 12.

The terminal apparatus 20 includes any general purpose electronic device, such as a personal computer (PC) or a smartphone. These examples are not limiting, however, and the terminal apparatus 20 may be one server apparatus or a plurality of server apparatuses that can communicate with each other, or any other electronic device dedicated to the measurement system 1.

The measurement module 12 includes a module that measures the state of the measurement target M using electromagnetic waves. The measurement module 12 includes a generator 121, a receiver 122, and a movable part 123.

The generator 121 includes any appropriate electromagnetic wave source capable of irradiating electromagnetic waves having a frequency within the terahertz region, for example, on the measurement target M. The receiver 122 includes any receiver capable of receiving electromagnetic waves, for example in the terahertz band, that are based on the electromagnetic waves irradiated on the measurement target M by the generator 121 and that include information on the spectroscopic spectrum of the measurement target M.

In the present specification, the electromagnetic waves irradiated from the generator 121 have a frequency within the terahertz region of 30 THz or less, for example. For example, the electromagnetic waves have a frequency within the terahertz region of 1 THz to 5 THz. The electromagnetic waves have a frequency that includes a frequency near the absorption peak of calcite, described below, such as the terahertz region of 3.27±1 THz. In the first embodiment, the "spectroscopic spectrum" includes, for example, a reflection spectrum of the measurement target M. For example, the spectroscopic spectrum includes the reflection spectrum at the interface between the first adherend A and the measurement target M in a measurement region R that includes a portion of the measurement target M near the first adherend A.

The movable part 123 includes any movable structure that can improve the portability of the measurement apparatus 10. For example, the movable part 123 includes tires attached to the measurement module 12. The measurement module 12 can be moved over the surface of the first adherend A by the tires that configure the movable part 123. The movable part 123 moves the measurement apparatus 10 to enable scanning of the irradiation position of the electromagnetic waves from the generator 121 on the measurement target M.

The control module 11 includes a data processor 111, a calculator 112, a command analyzer 113, a spectrum analyzer 114, and a generator/receiver controller 115. The data processor 111, the calculator 112, the command analyzer 113, the spectrum analyzer 114, and/or the generator/receiver controller 115 may together form one controller 116. In addition to the controller 116, the control module 11 includes a storage 117.

The controller 116 includes one or more processors. The "processor" in an embodiment is a general purpose processor or a dedicated processor specialized for particular processing, but these examples are not limiting. The controller 116 is communicably connected with each component of the measurement apparatus 10 and controls operations of the measurement apparatus 10 overall.

The storage 117 includes any storage module, such as a hard disk drive (HDD), a solid state drive (SSD), an electrically erasable programmable read-only memory (EEPROM), a read-only memory (ROM), and a random access memory (RAM). The storage 117 may, for example, function as a main memory, an auxiliary memory, or a cache memory. The storage 117 stores any information used for operations of the measurement apparatus 10, any information resulting from operations of the measurement apparatus 10, and the like.

For example, the storage 117 stores the below-described reference data necessary for calculating the ratio information. For example, the storage 117 stores information, acquired using the measurement module 12, on the spectroscopic spectrum of the measurement target M. For example, the storage 117 stores information related to the ratio information calculated by the controller 116. For example, the storage 117 may store a system program, an application program, and the like. The storage 117 is not limited to being internal to the control module 11 and may include an external storage module connected through a digital input/output port, such as universal serial bus (USB).

For example, the measurement apparatus 10 is arranged on the first adherend A by the user at a position directly above the adhesive interface point where the measurement is actually performed on the measurement target M. The terminal apparatus 20 accepts input operations from the user and transmits commands, including measurement execution commands, to the measurement apparatus 10.

The data processor 111 of the measurement apparatus 10 receives the commands transmitted from the terminal apparatus 20 and outputs the commands to the command analyzer 113. The command analyzer 113 analyzes the content of the commands transmitted from the terminal apparatus 20. In a command packet, initial setting data is stored together with the measurement execution command. Such initial setting data is stored in the storage 117, for example. In the present specification, the "initial setting data" includes, for example, reference data, fitting parameters, and initial values of each fitting parameter. In addition, the initial setting data may include, for example, the ratio of the second substance to the first substance in the measurement target M immediately after the first substance, such as vaterite as a marker, is added to the measurement target M in advance, and when no foreign substance such as water has entered into the measurement target M from the outside, and/or the peak intensity of the spectroscopic spectrum, described below, as initial values.

In the first embodiment, the "reference data" includes, for example, the frequency dependence of the complex refractive index of the first adherend A and the frequency dependence of the complex refractive index of the measurement target M in the absence of the additive. Additionally, the reference data includes the frequency dependence of the complex refractive index of the first substance and the frequency dependence of the complex refractive index of the second substance. In the first embodiment, the "fitting parameters" include, for example, the thickness of the first adherend A, the ratio of the second substance to the first substance, and the concentration of the additive in the measurement target M.

In the present specification, the "ratio of the second substance to the first substance" may, for example, include the percentage of the second substance when the sum of the percentage of the first substance and the percentage of the second substance in the additive is defined as 100%. This example is not limiting, and the ratio of the second substance to the first substance may, for example, include the value obtained by dividing the amount of the second substance by the amount of the first substance in the additive. Such a ratio may be an absolute value or may be a relative value that indicates the extent to which the value has changed from the initial value when, for example, the initial value is unknown.

The generator/receiver controller 115 of the measurement apparatus 10 automatically adjusts the position and angle of the generator 121 so that predetermined generation conditions are satisfied. In the first embodiment, the "predetermined generation conditions" include, for example, the condition that the electromagnetic waves irradiated by the generator 121 are incident on the measurement region R at a freely chosen angle of incidence. For example, the angle of incidence may be a small angle close to zero degrees or may be zero degrees. In other words, the generator 121 may be set at a position and angle that enable measurement considered to be substantially perpendicular incidence or perpendicular incidence relative to the measurement region R. This example is not limiting, and the generator/receiver controller 115 may adjust the position and angle of the generator 121 based on setting values inputted by the user using the terminal apparatus 20 and transmitted from the terminal apparatus 20.

The generator/receiver controller 115 of the measurement apparatus 10 automatically adjusts the position and angle of the receiver 122 so that predetermined reception conditions are satisfied. In the first embodiment, the "predetermined reception conditions" include, for example, the condition that the electromagnetic waves reflected at any reflection angle in the measurement region R are incident on the receiver 122. For example, the reflection angle may match the aforementioned angle of incidence, may be a small angle close to zero degrees, or may be zero degrees. In other words, the receiver 122 may be set at a position and angle that enable measurement considered to be substantially perpendicular reflection or perpendicular reflection relative to the measurement region R. This example is not limiting, and the generator/receiver controller 115 may adjust the position and angle of the receiver 122 based on setting values inputted by the user using the terminal apparatus 20 and transmitted from the terminal apparatus 20.

The generator/receiver controller 115 controls the generator 121 to irradiate electromagnetic waves in the terahertz band on the measurement region R. For example, the generator/receiver controller 115 controls the generator 121 to output short pulses of electromagnetic waves ranging from 10 ps to several 10 ps using time-domain spectroscopy (TDS). At this time, the generator 121 may output electromagnetic waves with any polarization. For example, the generator 121 may output linearly polarized electromagnetic waves having a P-polarized component or linearly polarized electromagnetic waves having an S-polarized component.

The generator/receiver controller 115 acquires the pulse signals arranged in a time series from the receiver 122. For example, the generator/receiver controller 115 controls the receiver 122 to receive the aforementioned short pulses of electromagnetic waves, which are in the terahertz band, using TDS. At this time, the receiver 122 may receive electromagnetic waves with any polarization in accordance with the electromagnetic waves outputted from the generator 121. For example, the receiver 122 may receive linearly polarized electromagnetic waves having a P-polarized component or linearly polarized electromagnetic waves having an S-polarized component.

The generator/receiver controller 115 outputs the acquired pulse signal to the spectrum analyzer 114. The spectrum analyzer 114 calculates the spectroscopic spectrum in the frequency domain by, for example, executing a Fourier transform process on the time waveform based on the pulse signals. For example, the pulse signals arranged in a time series outputted from the receiver 122 correspond to short-pulse electromagnetic waves reflected as reflected waves at the surface of the first adherend A, the measurement region R, the interface between the measurement target M and the second adherend B, the back surface of the second adherend B, and the like. The spectrum analyzer 114 may extract the pulse signals positioned at the time corresponding to the reflection in the measurement region R and calculate the spectroscopic spectrum by the above-described method.

The calculator 112 uses the spectroscopic spectrum calculated in the spectrum analyzer 114 to calculate the ratio information between the first substance and the second substance, as described below. The calculator 112 generates diagnostic information regarding entry of a foreign substance based on the calculated ratio information. In the present specification, the "diagnostic information" includes, for example, a history indicating entry of a foreign substance into the measurement target M. This example is not limiting, and the diagnostic information may, for example, include a notification indicating deterioration of the measurement target M due to the entry of a foreign substance. The diagnostic information may, for example, include the duration of entry of the foreign substance into the measurement target M or the temperature of the foreign substance during entry of the foreign substance into the measurement target M. The diagnostic information may, for example, include a spatial distribution of the ratio information in the measurement target M.

The data processor 111 transmits the results of calculation by the calculator 112 to the terminal apparatus 20. The terminal apparatus 20 displays the received calculation results, i.e., the diagnostic information, to the user.

In a case in which a scanning range is specified, the control module 11 executes the same measurement process at each measurement point while using the tires that configure the movable part 123 to move the measurement module 12.

Figure 2:
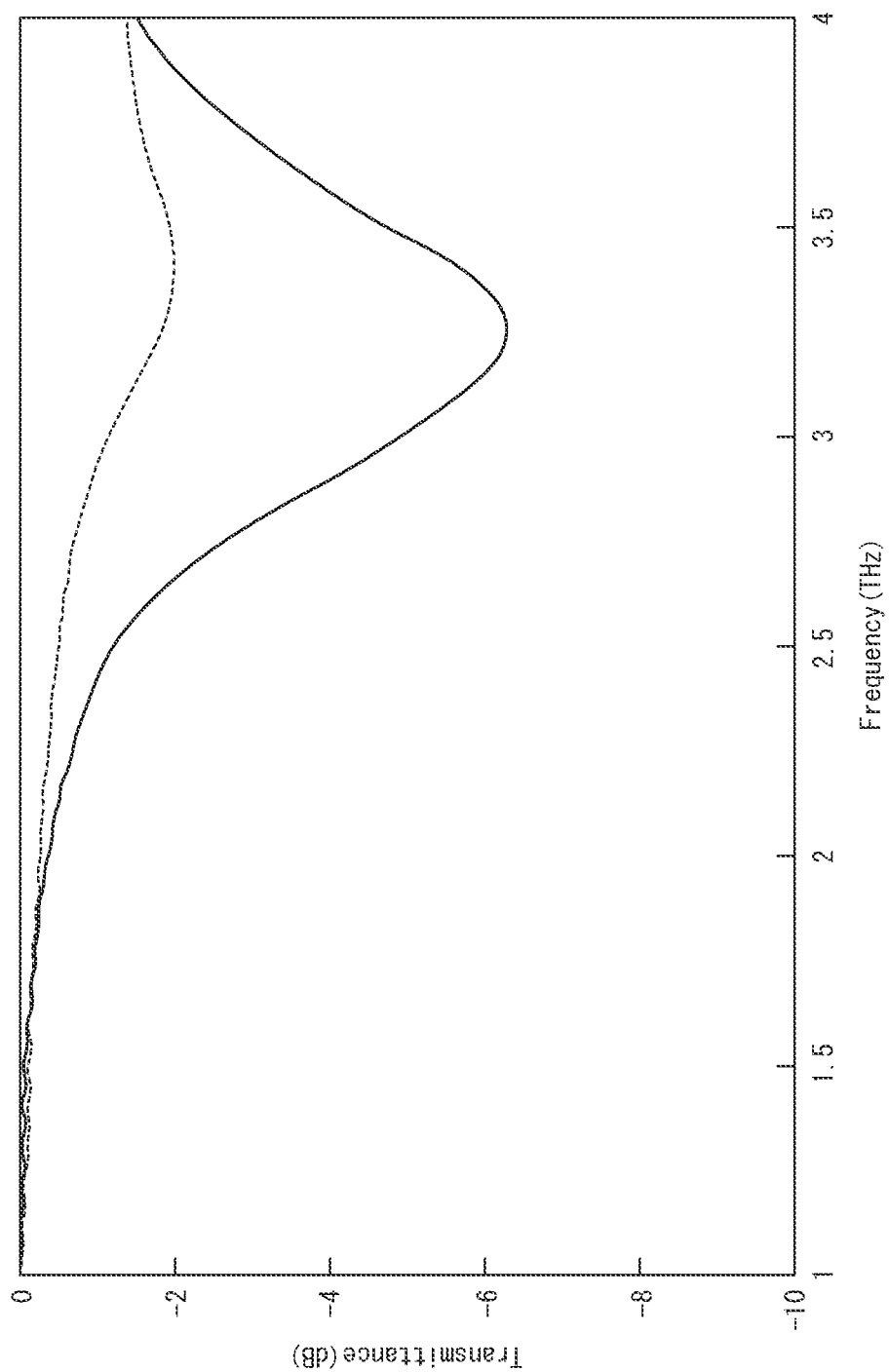
FIG. 2 is a graph illustrating an example of experimental results of the transmission characteristics of calcium carbonate.

FIG. 2 is a graph illustrating an example of experimental results of the transmission characteristics of calcium carbonate. With reference to FIG. 2, the way in which vaterite in an unstable state gradually undergoes a crystal structure transition, due to a foreign substance such as water, to calcite in a stable state is mainly described.

There are three known crystal structures of calcium carbonate: calcite in a stable state, aragonite in a metastable state, and vaterite in an unstable state. Vaterite is rarely found in nature, but it can be obtained artificially by chemical synthesis.

In the experimental results illustrated in FIG. 2, the dotted line indicates the transmission spectrum of a sample containing, for example, vaterite with a yield of nearly 70% and calcite for the remaining percentage. The dotted line illustrates the result of the measurement of the sample at room temperature before immersion. As is clear from the experimental results illustrated by the dotted line, no prominent absorption peak occurs near 3.27 THz for vaterite.

On the other hand, the solid line illustrates the results of measuring the transmission spectrum of the sample after the sample is immersed in water at room temperature for 24 hours and then sufficiently dried at room temperature. Calcium carbonate with a calcite crystal structure is known to have a prominent absorption peak at 3.27 THz. The intensity of the absorption peak at 3.27 THz on the solid line in FIG. 2 indicates that almost all of the vaterite has undergone a crystal structure transition to calcite due to contact with water.

Calcite has a stable crystal structure, and this crystal structure is maintained unless the calcite is placed in a special environment. Therefore, the experimental results illustrated in FIG. 2 indicate that the spectroscopic spectrum near 3.27 THz can be used for the calculator 112 to generate diagnostic information.

Figure 3:
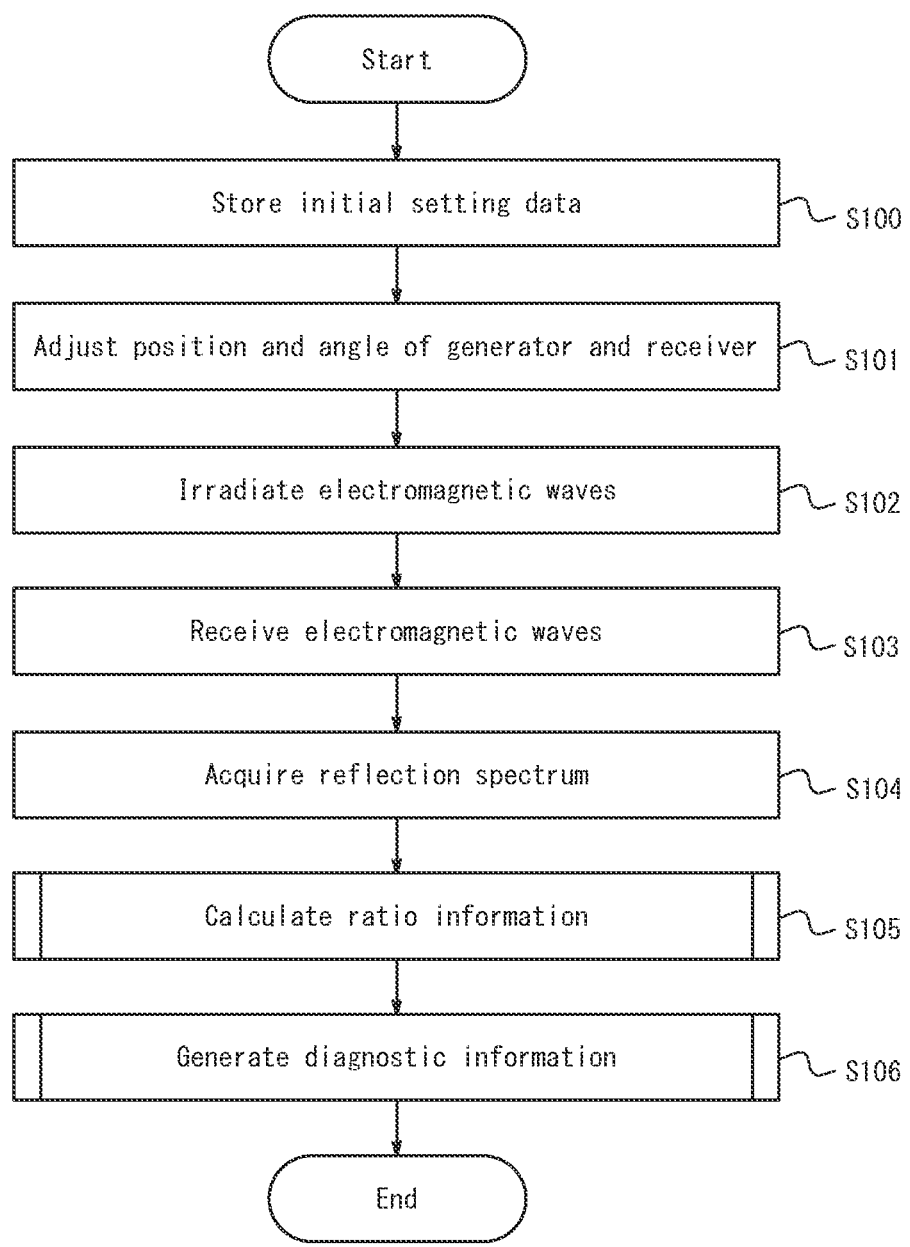
FIG. 3 is a flowchart illustrating a first example of operations of the measurement apparatus in FIG. 1.

FIG. 3 is a flowchart illustrating a first example of operations of the measurement apparatus 10 in FIG. 1. With reference to FIG. 3, an example of the basic flow of the processing, executed by the controller 116 of the measurement apparatus 10, to calculate the ratio information is described.

As a prior condition, it is assumed that an appropriate amount of a substance such as calcium carbonate is included in the measurement target M as an additive. At the stage of the work to bond the measuring object M to the first adherend A and the second adherend B, all or most of the substance has an unstable structure like the first substance. The first substance undergoes an irreversible structural transition to the second substance upon contact with a foreign substance. For example, by monitoring at and around the absorption peak of the second substance obtained by terahertz spectroscopy, the user can understand the history indicating entry of a foreign substance into the measurement target M.

In step S100, the controller 116 acquires initial setting data from the terminal apparatus 20 and stores the initial setting data in the storage 117.

In step S101, the controller 116 automatically adjusts the position and angle of the generator 121 so that the predetermined generation conditions are satisfied. The controller 116 automatically adjusts the position and angle of the receiver 122 so that the predetermined reception conditions are satisfied.

In step S102, the controller 116 irradiates electromagnetic waves on the measurement region R using the generator 121 automatically adjusted in step S101.

In step S103, the controller 116 uses the receiver 122 to receive electromagnetic waves including information on the spectroscopic spectrum of the measurement target M based on the electromagnetic waves irradiated in step S102.

In step S104, the controller 116 acquires the reflection spectrum of the measurement target M, based on the electromagnetic waves received by the receiver 122 in step S103, as the measured spectroscopic spectrum of the measurement target M.

In step S105, the controller 116 calculates the ratio information between the first substance and the second substance based on the measured reflection spectrum acquired in step S104.

In step S106, the controller 116 generates diagnostic information related to the entry of a foreign substance based on the ratio information calculated in step S105. The controller 116 transmits the generated diagnostic information to the terminal apparatus 20.

Figure 4:
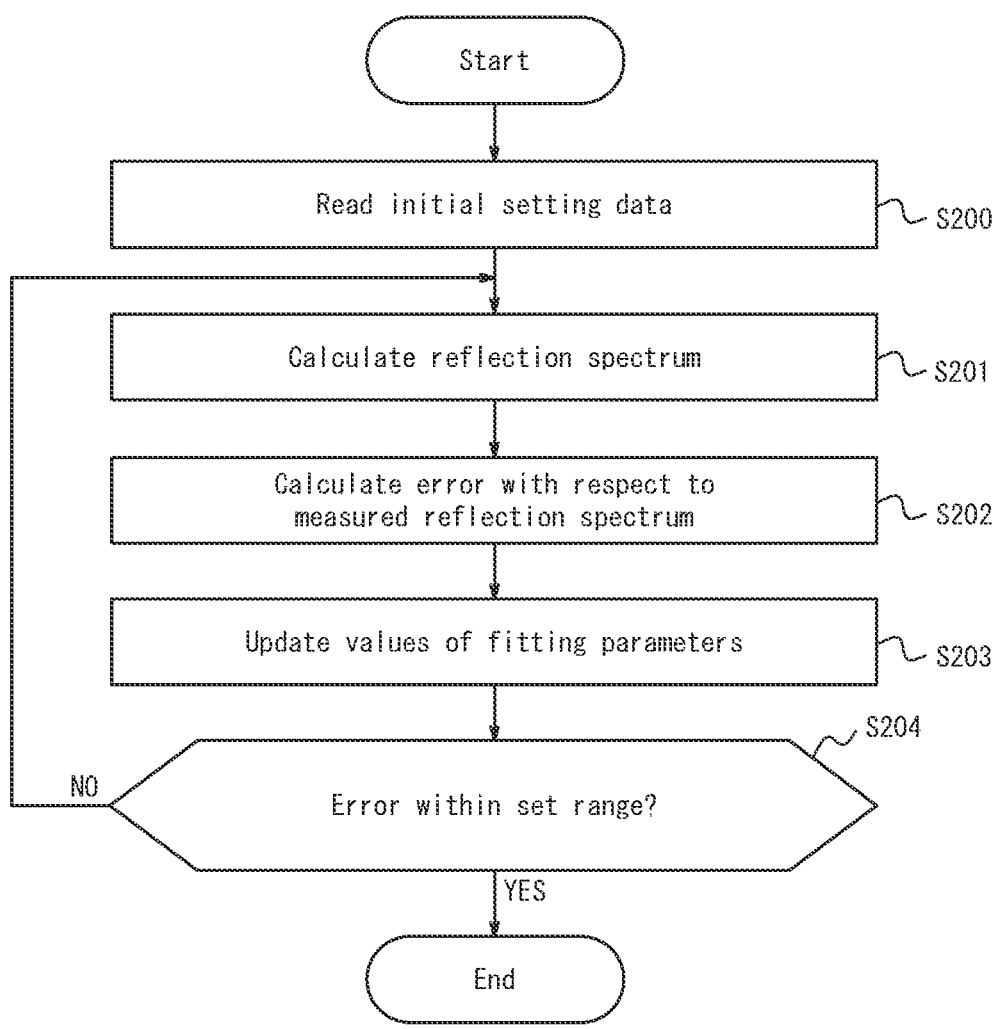
FIG. 4 is a flowchart illustrating a second example of operations of the measurement apparatus in FIG. 1.

FIG. 4 is a flowchart illustrating a second example of operations of the measurement apparatus 10 in FIG. 1. The flowchart illustrated in FIG. 4 is an example of a more specific flow of the calculation process in step S105 of FIG. 3. With reference to FIG. 4, the calculation process in step S105 of FIG. 3 is described in more detail.

In the step of calculating the ratio information in step S105, the controller 116 may execute the fitting calculation process for the measured reflection spectrum acquired in step S104 based on the reference data and fitting parameters necessary for calculating the spectroscopic spectrum, and the initial values of the fitting parameters. The controller 116 may thus calculate the ratio of the second substance to the first substance as the ratio information.

In step S200, the controller 116 reads the initial setting data.

In step S201, based on the initial setting data read in step S200, the controller 116 calculates the reflection spectrum of the measurement target M based on the electromagnetic waves observed by the receiver 122. In greater detail, the controller 116 calculates the reflection spectrum of the measurement target M based on a predetermined physical model equation.

In step S202, the controller 116 calculates the error between the reflection spectrum calculated in step S201 and the actual reflection spectrum acquired in step S104 of FIG. 3. For example, the controller 116 calculates the least squares error at all frequency points.

In step S203, the controller 116 updates the value of each fitting parameter read in step S200 based on the calculation results of step S202.

In step S204, the controller 116 determines whether the error calculated in step S202 is within a set range. For example, the controller 116 determines whether the least squares error at all frequency points is within a set range. Upon determining that the error is within the set range, the controller 116 terminates the process. Upon determining that the error is not within the set range, the controller 116 executes the process of step S201 again.

As described above, the controller 116 calculates the fitting parameters, by fitting with iterative calculations or the like, based on the measured data of the reflection spectrum and a physical model equation. The controller 116 confirms the degree of matching between the measured data and the physical model equation in each iterative calculation and terminates the fitting calculation process upon determining that sufficient convergence has been reached.

Figure 5:
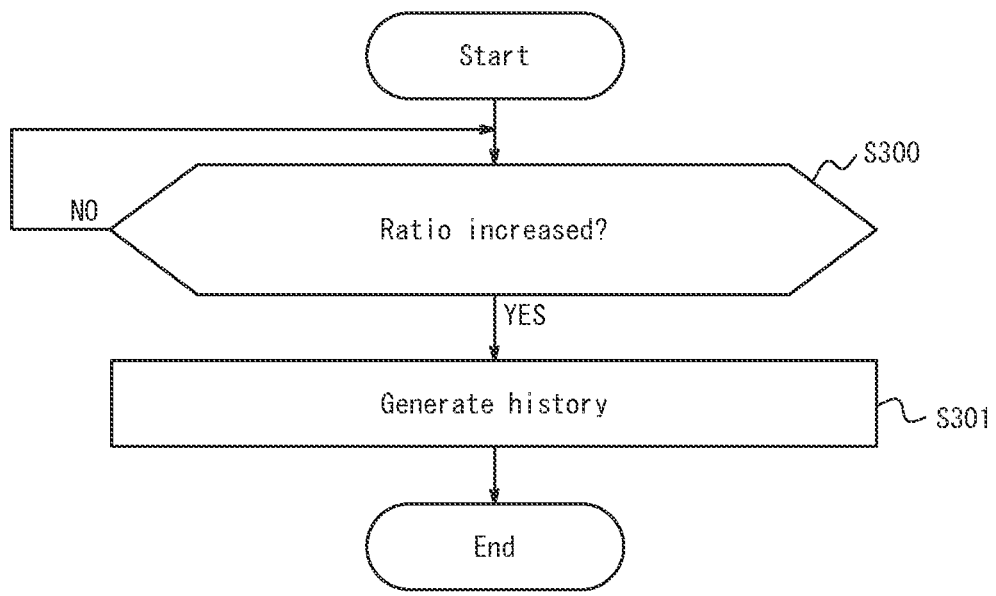
FIG. 5 is a flowchart illustrating a third example of operations of the measurement apparatus in FIG. 1.

FIG. 5 is a flowchart illustrating a third example of operations of the measurement apparatus 10 in FIG. 1. The flowchart illustrated in FIG. 5 is an example of a more specific flow of the process in step S106 of FIG. 3. With reference to FIG. 5, the process in step S106 of FIG. 3 is described in more detail. For example, upon determining that a parameter included in the ratio information has increased, the controller 116 may generate, as the diagnostic information, a history indicating entry of a foreign substance into the measurement target M. The ratio of the second substance to the first substance is described below as an example of a parameter included in the ratio information, but the same description also applies to the peak intensity of the spectroscopic spectrum.

In step S300, the controller 116 determines whether the ratio of the second substance to the first substance calculated in step S105 has increased. For example, the controller 116 makes this determination by comparing the ratio, stored in the storage 117 as initial setting data in step S100, of the second substance to the first substance in the measurement target M in a state in which no foreign substance such as water has entered into the measurement target M from the outside with the ratio calculated in step S105. Upon determining that the ratio of the second substance to the first substance has increased, the controller 116 executes the process of step S301. Upon determining that the ratio of the second substance to the first substance has not increased, i.e., that the ratio of the second substance to the first substance has not changed, the controller 116 executes the process of step S300 again.

In step S301, after determining that the ratio of the second substance to the first substance has increased in step S300, the controller 116 generates a history, as the diagnostic information, indicating entry of a foreign substance into the measurement target M.

Figure 6:
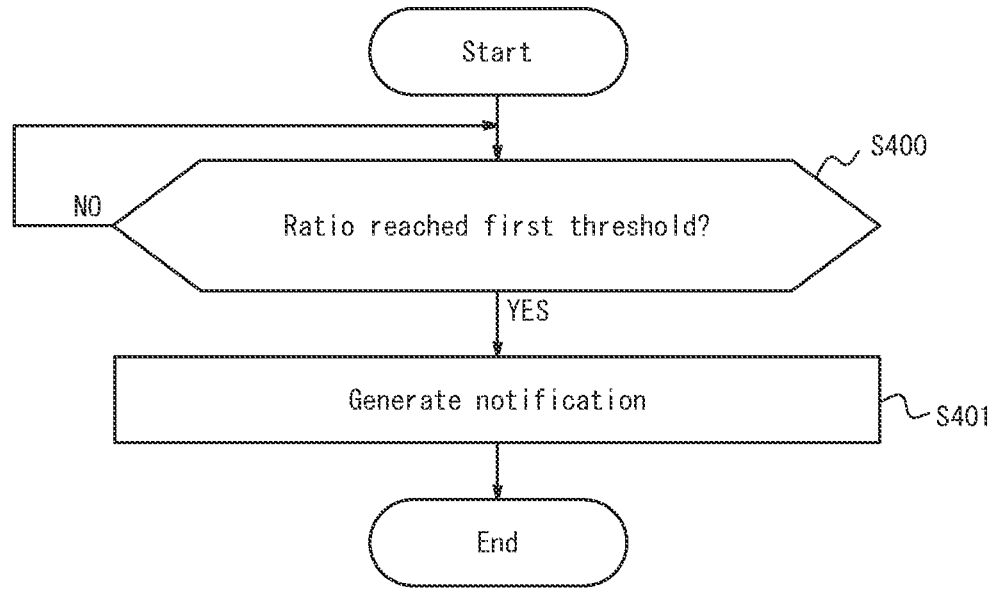
FIG. 6 is a flowchart illustrating a fourth example of operations of the measurement apparatus in FIG. 1.

FIG. 6 is a flowchart illustrating a fourth example of operations of the measurement apparatus 10 in FIG. 1. The flowchart illustrated in FIG. 6 is an example of a more specific flow of the process in step S106 of FIG. 3. With reference to FIG. 6, the process in step S106 of FIG. 3 is described in more detail. For example, upon determining that a parameter included in the ratio information has reached a threshold, the controller 116 may generate, as the diagnostic information, a notification indicating deterioration of the measurement target M due to entry of a foreign substance.

In step S400, the controller 116 determines whether the ratio of the second substance to the first substance calculated in step S105 has reached a first threshold. Upon determining that the ratio of the second substance to the first substance has reached the first threshold, the controller 116 executes the process of step S401. Upon determining that the ratio of the second substance to the first substance has not reached the first threshold, the controller 116 executes the process of step S400 again.

In step S401, after determining that the ratio of the second substance to the first substance has reached the first threshold in step S400, the controller 116 generates a notification, as the diagnostic information, indicating deterioration of the measurement target M due to entry of a foreign substance.

The aforementioned first threshold value may be set appropriately by the user based on empirical data that, for example, associates the ratio of the second substance to the first substance in the measurement target M with the amount of foreign substance that has entered into the measurement target M and the degree of deterioration of the measurement target M. At this time, the user may set the first threshold in consideration of the resolution, signal-to-noise ratio, measurement variability, measurement reproducibility, and the like of the measurement apparatus 10.

FIG. 7 is a flowchart illustrating a fifth example of operations of the measurement apparatus 10 in FIG. 1. The flowchart illustrated in FIG. 7 is an example of a more specific flow of the process in step S106 of FIG. 3. With reference to FIG. 7, the process in step S106 of FIG. 3 is described in more detail. For example, upon determining that a parameter included in the ratio information has reached a threshold, the controller 116 may generate, as the diagnostic information, a notification indicating deterioration of the measurement target M due to entry of a foreign substance.

In step S500, the controller 116 determines whether the peak intensity of the spectroscopic spectrum calculated in step S105 has reached the second threshold based on the spectroscopic spectrum acquired in step S104. In other words, the controller 116 may simply calculate the peak intensity of the spectroscopic spectrum without executing the fitting calculation process in step S105. For example, the controller 116 determines whether the intensity of the absorption peak near 3.27 THz in the reflection spectrum acquired in step S104 has reached the second threshold. Upon determining that the peak intensity has reached the second threshold, the controller 116 executes the process of step S501. Upon determining that the peak intensity has not reached the second threshold, the controller 116 executes the process of step S500 again.

In step S501, after determining that the peak intensity has reached the second threshold in step S500, the controller 116 generates a notification, as the diagnostic information, indicating deterioration of the measurement target M due to entry of a foreign substance.

The aforementioned second threshold value may be set appropriately by the user based on empirical data that, for example, associates the peak intensity of the spectroscopic spectrum of the measurement target M with the amount of foreign substance that has entered into the measurement target M and the degree of deterioration of the measurement target M. At this time, the user may set the second threshold in consideration of the resolution, signal-to-noise ratio, measurement variability, measurement reproducibility, and the like of the measurement apparatus 10.

FIG. 8 is a flowchart illustrating a sixth example of operations of the measurement apparatus 10 in FIG. 1. The flowchart illustrated in FIG. 8 is an example of a more specific flow of the process in step S106 of FIG. 3. With reference to FIG. 8, the process in step S106 of FIG. 3 is described in more detail. For example, based on the ratio information, the controller 116 may calculate the duration of entry of the foreign substance into the measurement target M or the temperature of the foreign substance during entry of the foreign substance into the measurement target M as the diagnostic information. The ratio of the second substance to the first substance is described below as an example of the ratio information, but the same description also applies to the peak intensity of the spectroscopic spectrum.

For example, based on the ratio of the second substance to the first substance calculated in step S105, the controller 116 calculates the duration of entry of the foreign substance into the measurement target M or the temperature of the foreign substance during entry of the foreign substance into the measurement target M as the diagnostic information. For example, it is known that the rate of the crystal structure transition from vaterite to calcite is dependent on the water temperature. Based on the ratio of the second substance to the substance calculated in step S105, the controller 116 can, for example, therefore calculate one of the water immersion duration and the water immersion temperature from the other.

In step S600, the controller 116 acquires either the duration of entry of the foreign substance into the measurement target M or the temperature of the foreign substance during entry of the foreign substance into the measurement target M. The controller 116 may acquire this information from the terminal apparatus 20 by input from the user using the terminal apparatus 20.

In step S601, the controller 116 calculates the other information based on the ratio of the second substance to the first substance calculated in step S105 and the information acquired in step S600.

In addition to or instead of the various diagnostic information described above, the controller 116 may generate, as the diagnostic information, a spatial distribution of the ratio information between the first and second substances in the measurement target M in conjunction with movement of the measurement apparatus 10 based on the movable part 123.

According to the above-described measurement apparatus 10 of the first embodiment, entry of a foreign substance into the measurement target M can be accurately detected. For example, the measurement apparatus 10 calculates the ratio information between the first substance and the second substance based on the acquired measured spectroscopic spectrum and generates the diagnostic information regarding entry of the foreign substance based on the ratio information. For example, the measurement apparatus 10 takes an adhesive or the like, to which vaterite has been added in advance as a marker, as the measurement target M and uses terahertz spectroscopy to observe the irreversible crystal structure transition from vaterite to calcite caused by moisture.

This configuration enables the measurement apparatus 10 to detect the history of moisture entry into the adhesive. In other words, the user can confirm whether a foreign substance has entered into the measurement target M in the past based on non-destructive and non-contact measurement. This enables detection of deterioration of the adhesive due to moisture, even if water enters into the adhesive from outside and subsequently dries out. The measurement apparatus 10 can estimate or indirectly detect slight chemical changes in the measurement target M. For example, when a foreign substance such as moisture enters into a measurement target M such as an adhesive, the hydrogen bonds at the interface of the adhesive are irreversibly broken, and recombination does not occur, even after the adhesive is dried. The measurement apparatus 10 can estimate or indirectly detect such slight chemical changes in the measurement target M.

The measurement apparatus 10 calculates the ratio of the second substance to the first substance by executing a fitting calculation process on the acquired measured spectroscopic spectrum. The aforementioned ratio together with the thickness of the first adherend A can thereby be calculated accurately by also using the thickness of the first adherend A as a fitting parameter, even if the thickness of a portion of the first adherend A adjacent to the measurement region R is unknown, for example. The first adherend A might, for example, scrape off as a result of long-term use while the first adherend A and the second adherend B are bonded by the measurement target M. Even in such a case in which the thickness of the first adherend A has changed since the start of use of the first adherend A, the measurement apparatus 10 can accurately calculate the aforementioned ratio along with the thickness of the first adherend A.

By a history being generated upon the measurement apparatus 10 determining that a parameter included in the ratio information has increased, the user can confirm such a history via the terminal apparatus 20, for example. By confirming such a history via the terminal apparatus 20 or the like, the user can easily understand that a foreign substance entered into the measurement target M.

By a notification being generated upon the measurement apparatus 10 determining that a parameter included in the ratio information has reached a threshold, the user can confirm such a notification via the terminal apparatus 20, for example. By confirming such a notification as a warning via the terminal apparatus 20 or the like, the user can easily understand that deterioration of the measurement target M due to entry of the foreign substance has exceeded an allowable range.

Based on the ratio information, the measurement apparatus 10 calculates the duration of entry of the foreign substance into the measurement target M or the temperature of the foreign substance during entry of the foreign substance into the measurement target M. This enables the user to check such information via the terminal apparatus 20, for example. By confirming such information via the terminal apparatus 20 or the like, the user can easily recognize a parameter related to entry of the foreign substance into the measurement target M.

By the measurement apparatus 10 generating the spatial distribution of the ratio information in the measurement target M, the user can confirm such a spatial distribution via the terminal apparatus 20, for example. By using the terminal apparatus 20 or the like to confirm such a spatial distribution as the measurement result, the user can easily recognize the deterioration of the measurement target M due to entry of a foreign substance over a wide range of parts in the measurement target M.

By calculating the ratio of the second substance to the first substance as the ratio information, the measurement apparatus 10 can accurately generate diagnostic information. By calculating the peak intensity of the spectroscopic spectrum as the ratio information, the measurement apparatus 10 can reduce the calculation load compared to when the measurement apparatus 10 calculates the ratio of the second substance to the first substance by, for example, a fitting calculation process.

The first substance includes calcium carbonate with a vaterite crystal structure, and the second substance includes calcium carbonate with a calcite crystal structure. This enables the measurement apparatus 10 to use calcium carbonate, which can take on two types of crystal structures that exhibit a marked difference regarding the presence or absence of an absorption peak near 3.27 THz, to generate the diagnostic information accurately.

By the spectroscopic spectrum including the reflection spectrum of the measurement target M, the measurement apparatus 10 can easily detect the history of entry of the foreign substance into the measurement target M near the interface on the first adherend A side. For example, the measurement apparatus 10 can easily estimate or indirectly detect slight chemical changes, such as irreversible breaking of hydrogen bonds at the interface of the adhesive.

In the measurement system 1 according to the first embodiment, the measurement apparatus 10 and the terminal apparatus 20 have been described as being separate apparatuses, but this configuration is not limiting. The measurement apparatus 10 and the terminal apparatus 20 may be integrally configured as a single apparatus.

In the first embodiment, the fitting parameters have been described as including the thickness of the first adherend A, the ratio of the second substance to the first substance, and the concentration of the additive in the measurement target M, but these examples are not limiting. It suffices for the fitting parameters to include at least the ratio of the second substance to the first substance, for example.

In the first embodiment, the measurement target M has been described as including the adhesive that bonds the first adherend A to the second adherend B, but this configuration is not limiting. The measurement target M may include any target whose state can be calculated based on the information on the spectroscopic spectrum. For example, the measurement target M need not be sandwiched by the first adherend A and the second adherend B. For example, the measurement target M may include any solid, liquid, or gas target. For example, the measurement target M may include a liquid flowing in the pipe corresponding to the first adherend A. As long as such a liquid contains a substance that undergoes a structural transition from a first substance with an unstable structure to a second substance with a stable structure due to entry of a foreign substance, the measurement apparatus 10 can generate the diagnostic information from outside the pipe.

In the first embodiment, the measurement apparatus 10 has been described as using an adhesive or the like, to which vaterite has been added in advance as a marker, as the measurement target M. This is example is not limiting, however. In addition to or instead of the first substance being added to the measurement target M, the first substance can be disposed directly by, for example, spraying or embedding the first substance at the interface on the first adherend A side in the measurement target M. This enables the measurement apparatus 10 to generate diagnostic information regarding entry of a foreign substance even when the foreign substance does not penetrate deep into the measurement target M, but only enters the interface on the first adherend A side of the measurement target M.

In the first embodiment, the electromagnetic waves irradiated by the generator 121 have been described as having a frequency within the terahertz region, but this example is not limiting. For example, the electromagnetic waves that are used are not limited to terahertz waves and may have a frequency within any region. For example, if the first adherend A is extremely thin, electromagnetic waves in the mid-infrared region may be used.

Second Embodiment

Figure 9:
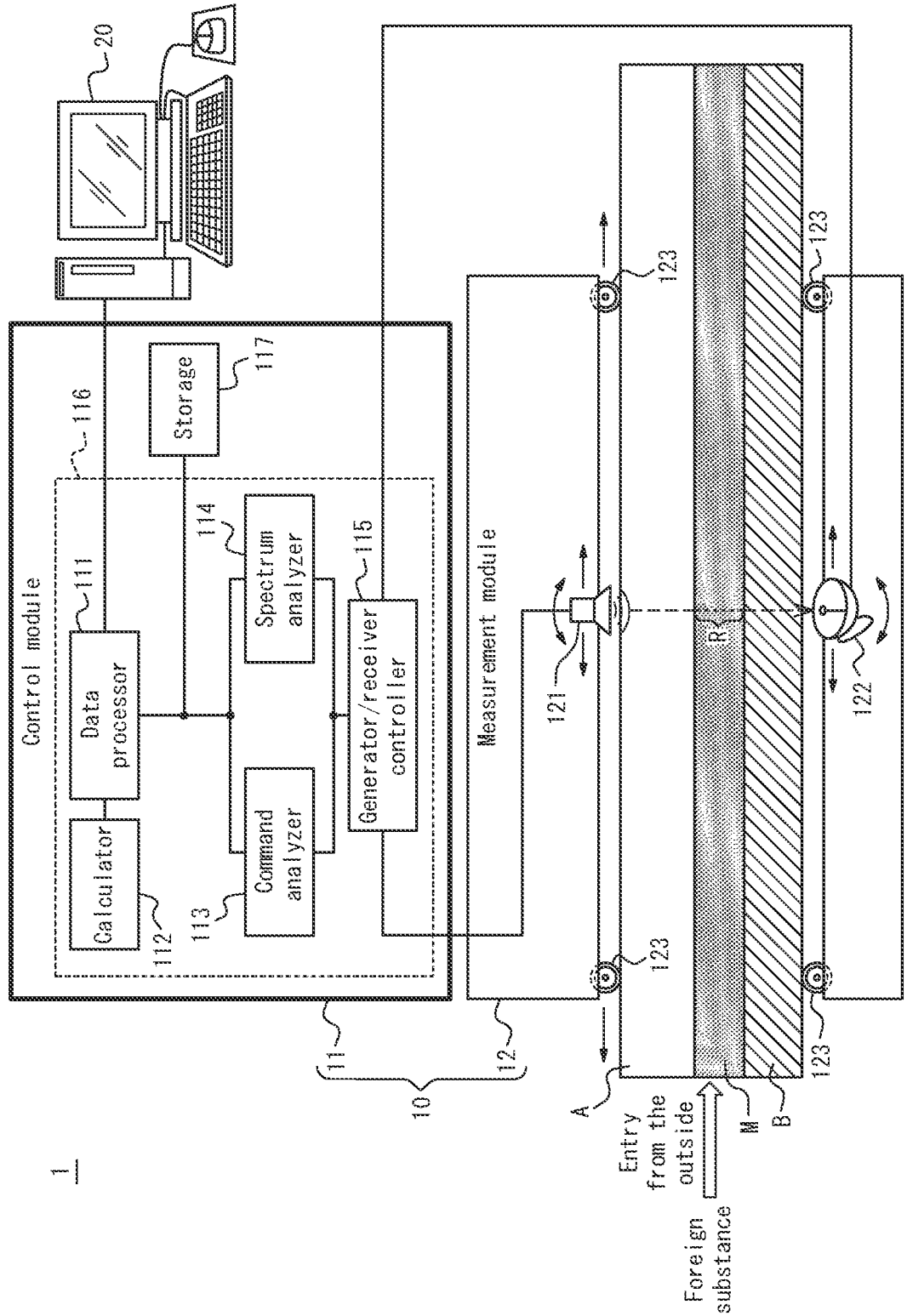
FIG. 9 is a schematic diagram illustrating the configuration of a measurement system including a measurement apparatus according to a second embodiment of the present disclosure.

FIG. 9 is a schematic diagram illustrating the configuration of a measurement system 1 including a measurement apparatus 10 according to a second embodiment of the present disclosure. The configuration of the measurement apparatus 10 according to the second embodiment is mainly described with reference to FIG. 9.

The measurement apparatus 10 of the second embodiment differs from the measurement apparatus 10 of the first embodiment by being a transmission type apparatus, as illustrated in FIG. 9, instead of a reflection type apparatus, as illustrated in FIG. 1. The other configurations, functions, effects, variations, and the like of the measurement apparatus 10 are the same as those of the first embodiment, and the corresponding descriptions also apply to the measurement apparatus 10 according to the second embodiment. Configurations that are the same as in the first embodiment are labeled below with the same reference signs, and a description thereof is omitted. The points that differ from the first embodiment will mainly be explained.

In the second embodiment, the "spectroscopic spectrum" includes, for example, a transmission spectrum of the measurement target M. For example, the spectroscopic spectrum includes the average absorption spectrum in the measurement region R along the thickness direction of the measurement target M.

In the second embodiment, the "reference data" includes, for example, the frequency dependence of the complex refractive index of the first adherend A, the frequency dependence of the complex refractive index of the second adherend B, and the frequency dependence of the complex refractive index of the measurement target M in the absence of the additive. Additionally, the reference data includes the frequency dependence of the complex refractive index of the first substance and the frequency dependence of the complex refractive index of the second substance. Furthermore, the reference data includes the thickness of the first adherend A and the thickness of the second adherend B. In the second embodiment, the "fitting parameters" include, for example, the thickness of the measurement target M, the ratio of the second substance to the first substance, and the concentration of the additive in the measurement target M.

The generator/receiver controller 115 of the measurement apparatus 10 automatically adjusts the position and angle of the generator 121 so that predetermined generation conditions are satisfied. In the second embodiment, the "predetermined generation conditions" include, for example, the condition that the electromagnetic waves irradiated by the generator 121 are incident on the measurement region R at a freely chosen angle of incidence and pass through the measurement region R. For example, the angle of incidence may be a small angle close to zero degrees or may be zero degrees. In other words, the generator 121 may be set at a position and angle that enable measurement considered to be substantially perpendicular incidence or perpendicular incidence relative to the measurement region R. This example is not limiting, and the generator/receiver controller 115 may adjust the position and angle of the generator 121 based on setting values inputted by the user using the terminal apparatus 20 and transmitted from the terminal apparatus 20.

The generator/receiver controller 115 of the measurement apparatus 10 automatically adjusts the position and angle of the receiver 122 so that predetermined reception conditions are satisfied. In the second embodiment, the "predetermined reception conditions" include, for example, the condition that the electromagnetic waves transmitted from any exit angle in the measurement region R are incident on the receiver 122. For example, the exit angle may be a small angle close to zero degrees or may be zero degrees. In other words, the receiver 122 may be set at a position and angle that enable measurement considered to be substantially perpendicular emission or perpendicular emission relative to the measurement region R. This example is not limiting, and the generator/receiver controller 115 may adjust the position and angle of the receiver 122 based on setting values inputted by the user using the terminal apparatus 20 and transmitted from the terminal apparatus 20.

Figure 10:
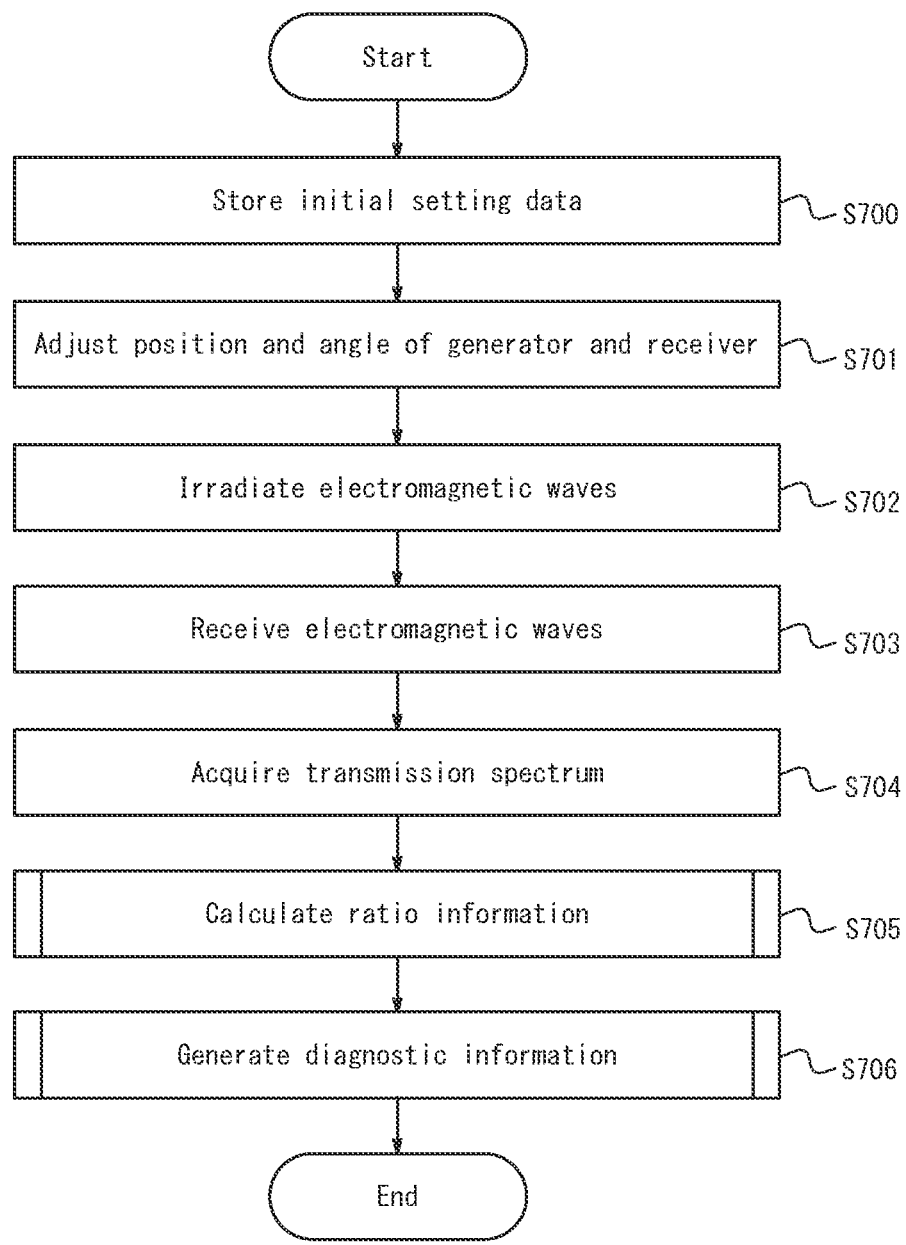
FIG. 10 is a flowchart illustrating a first example of operations of the measurement apparatus in FIG. 9.

FIG. 10 is a flowchart illustrating a first example of operations of the measurement apparatus 10 in FIG. 9. With reference to FIG. 10, an example of the basic flow of the processing, executed by the controller 116 of the measurement apparatus 10, to calculate the ratio information is described.

In step S700, the controller 116 acquires initial setting data from the terminal apparatus 20 and stores the initial setting data in the storage 117.

In step S701, the controller 116 automatically adjusts the position and angle of the generator 121 so that the predetermined generation conditions are satisfied. The controller 116 automatically adjusts the position and angle of the receiver 122 so that the predetermined reception conditions are satisfied.

In step S702, the controller 116 irradiates electromagnetic waves on the measurement region R using the generator 121 automatically adjusted in step S701.

In step S703, the controller 116 uses the receiver 122 to receive electromagnetic waves including information on the spectroscopic spectrum of the measurement target M based on the electromagnetic waves irradiated in step S702.

In step S704, the controller 116 acquires the transmission spectrum of the measurement target M, based on the electromagnetic waves received by the receiver 122 in step S703, as the measured spectroscopic spectrum of the measurement target M.

In step S705, the controller 116 calculates the ratio information between the first substance and the second substance based on the measured transmission spectrum acquired in step S704.

In step S706, the controller 116 generates diagnostic information related to the entry of a foreign substance based on the ratio information calculated in step S705. The controller 116 transmits the generated diagnostic information to the terminal apparatus 20.

Figure 11:
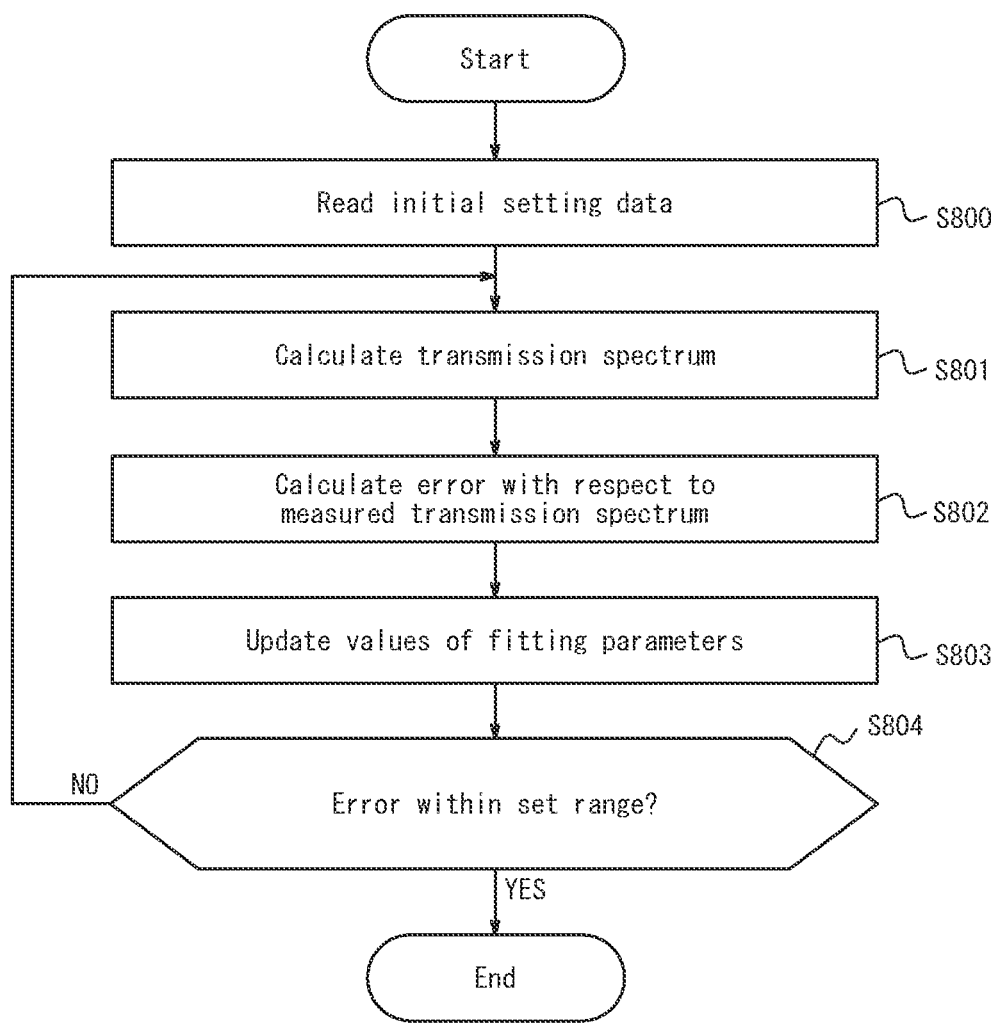
FIG. 11 is a flowchart illustrating a second example of operations of the measurement apparatus in FIG. 9.

FIG. 11 is a flowchart illustrating a second example of operations of the measurement apparatus 10 in FIG. 9. The flowchart illustrated in FIG. 11 is an example of a more specific flow of the calculation process in step S705 of FIG. 10. With reference to FIG. 11, the calculation process in step S705 of FIG. 10 is described in more detail.

In the step of calculating the ratio information in step S705, the controller 116 executes the fitting calculation process for the measured transmission spectrum acquired in step S704 based on the reference data and fitting parameters necessary for calculating the spectroscopic spectrum, and the initial values of the fitting parameters. The controller 116 thus calculates the ratio of the second substance to the first substance.

In step S800, the controller 116 reads the initial setting data.

In step S801, based on the initial setting data read in step S800, the controller 116 calculates the transmission spectrum of the measurement target M based on the electromagnetic waves observed by the receiver 122. In greater detail, the controller 116 calculates the transmission spectrum of the measurement target M based on a predetermined physical model equation.

In step S802, the controller 116 calculates the error between the transmission spectrum calculated in step S801 and the actual transmission spectrum acquired in step S704 of FIG. 10. For example, the controller 116 calculates the least squares error at all frequency points.

In step S803, the controller 116 updates the value of each fitting parameter read in step S800 based on the calculation results of step S802.

In step S804, the controller 116 determines whether the error calculated in step S802 is within a set range. For example, the controller 116 determines whether the least squares error at all frequency points is within a set range. Upon determining that the error is within the set range, the controller 116 terminates the process. Upon determining that the error is not within the set range, the controller 116 executes the process of step S801 again.

As described above, the controller 116 calculates the fitting parameters, by fitting with iterative calculations or the like, based on the measured data of the transmission spectrum and a physical model equation. The controller 116 confirms the degree of matching between the measured data and the physical model equation in each iterative calculation and terminates the fitting calculation process upon determining that sufficient convergence has been reached.

According to the above-described measurement apparatus 10 of the second embodiment, the spectroscopic spectrum includes the transmission spectrum of the measurement target M, thereby enabling the measurement apparatus 10 easily to detect the history of entry of a foreign substance as average information for the entire measurement region R along the thickness of the measurement target M. For example, by the electromagnetic waves irradiated by the generator 121 having a frequency within the terahertz region, transmittance with respect to any measurement target M can be obtained more reliably. This enables the measurement apparatus 10 to detect the state deep within the measurement target M more reliably.

In the second embodiment, the fitting parameters have been described as including the thickness of the measurement target M, the ratio of the second substance to the first substance, and the concentration of the additive in the measurement target M, but these examples are not limiting. The fitting parameters may further include the thickness of the first adherend A and/or the thickness of the second adherend B.

Although the present disclosure is based on embodiments and drawings, it is to be noted that various changes and modifications may be made by those skilled in the art based on the present disclosure. Therefore, such changes and modifications are to be understood as included within the scope of the present disclosure. For example, the functions and the like included in the various configurations and steps may be reordered in any logically consistent way. Furthermore, components or steps may be combined into one or divided.

For example, the present disclosure may also be embodied as a program containing a description of the processing for achieving the functions of the above-described measurement apparatus 10 or a storage medium with the program recorded thereon. Such embodiments are also to be understood as falling within the scope of the present disclosure.

For example, the shape, arrangement, orientation, and number of the above-described components are not limited to the above explanation or the drawings. The shape, arrangement, orientation, and number of each component may be selected freely as long as the functions of the component can be achieved.

For example, the measurement apparatus 10 may execute only one of the calculation processes described in the above first embodiment and second embodiment, or may execute both in parallel. For example, by the measurement apparatus 10 acquiring both the reflection spectrum and the transmission spectrum of the measurement target M, the user can understand whether the foreign substance entered the measurement target M at the interface on the first adherend A side or at the interface on the second adherend B side. For example, in a case in which a history of entry of the foreign substance is not detected based on the reflection spectrum of the measurement target M whereas a history of entry of the foreign substance is detected based on the transmission spectrum of the measurement target M, the user can determine that the foreign substance entered into the measurement target M from the interface on the second adherend B side.

The invention claimed is:

1. A measurement apparatus comprising:
   a generator configured to irradiate electromagnetic waves on a measurement target including a substance that undergoes a structural transition from a first substance with an unstable structure to a second substance with a stable structure due to entry of a foreign substance;
   a receiver configured to receive the electromagnetic waves including information on a spectroscopic spectrum of the measurement target; and
   a controller configured to acquire the measured spectroscopic spectrum based on the electromagnetic waves received by the receiver, calculate ratio information between the first substance and the second substance based on the acquired measured spectroscopic spectrum, and generate diagnostic information regarding entry of the foreign substance based on the ratio information.

2. The measurement apparatus of claim 1, wherein the controller executes a fitting calculation process on the acquired measured spectroscopic spectrum based on reference data and a fitting parameter necessary for calculating the spectroscopic spectrum and on an initial value of the fitting parameter to calculate a ratio of the second substance to the first substance as the ratio information.

3. The measurement apparatus of claim 1, wherein upon determining that a parameter included in the ratio information has increased, the controller generates a history indicating entry of the foreign substance into the measurement target as the diagnostic information.

4. The measurement apparatus of claim 1, wherein upon determining that a parameter included in the ratio information has reached a threshold, the controller generates a notification indicating deterioration of the measurement target due to entry of the foreign substance as the diagnostic information.

5. The measurement apparatus of claim 1, wherein based on the ratio information, the controller calculates a duration of entry of the foreign substance into the measurement target or a temperature of the foreign substance during entry of the foreign substance into the measurement target as the diagnostic information.

6. The measurement apparatus of claim 1, further comprising:
   a movable part configured to move the measurement apparatus to enable scanning of an irradiation position of the electromagnetic waves on the measurement target, wherein
   the controller generates, as the diagnostic information, a spatial distribution of the ratio information in the measurement target in conjunction with movement of the measurement apparatus based on the movable part.

7. The measurement apparatus of claim 1, wherein the ratio information includes a ratio of the second substance to the first substance in the measurement target and/or a peak intensity of the spectroscopic spectrum.

8. The measurement apparatus of claim 1, wherein
the foreign substance includes calcium carbonate,
the first substance includes calcium carbonate with a vaterite crystal structure, and
the second substance includes calcium carbonate with a calcite crystal structure.

9. The measurement apparatus of claim 1, wherein the spectroscopic spectrum includes a reflection spectrum and/or a transmission spectrum of the measurement target.

10. A measurement method comprising:
irradiating electromagnetic waves on a measurement target including a substance that undergoes a structural transition from a first substance with an unstable structure to a second substance with a stable structure due to entry of a foreign substance;
receiving the electromagnetic waves including information on a spectroscopic spectrum of the measurement target;
acquiring the measured spectroscopic spectrum based on the received electromagnetic waves;
calculating ratio information between the first substance and the second substance based on the acquired measured spectroscopic spectrum; and
generating diagnostic information regarding entry of the foreign substance based on the calculated ratio information.

* * * * *